Patented Apr. 15, 1930

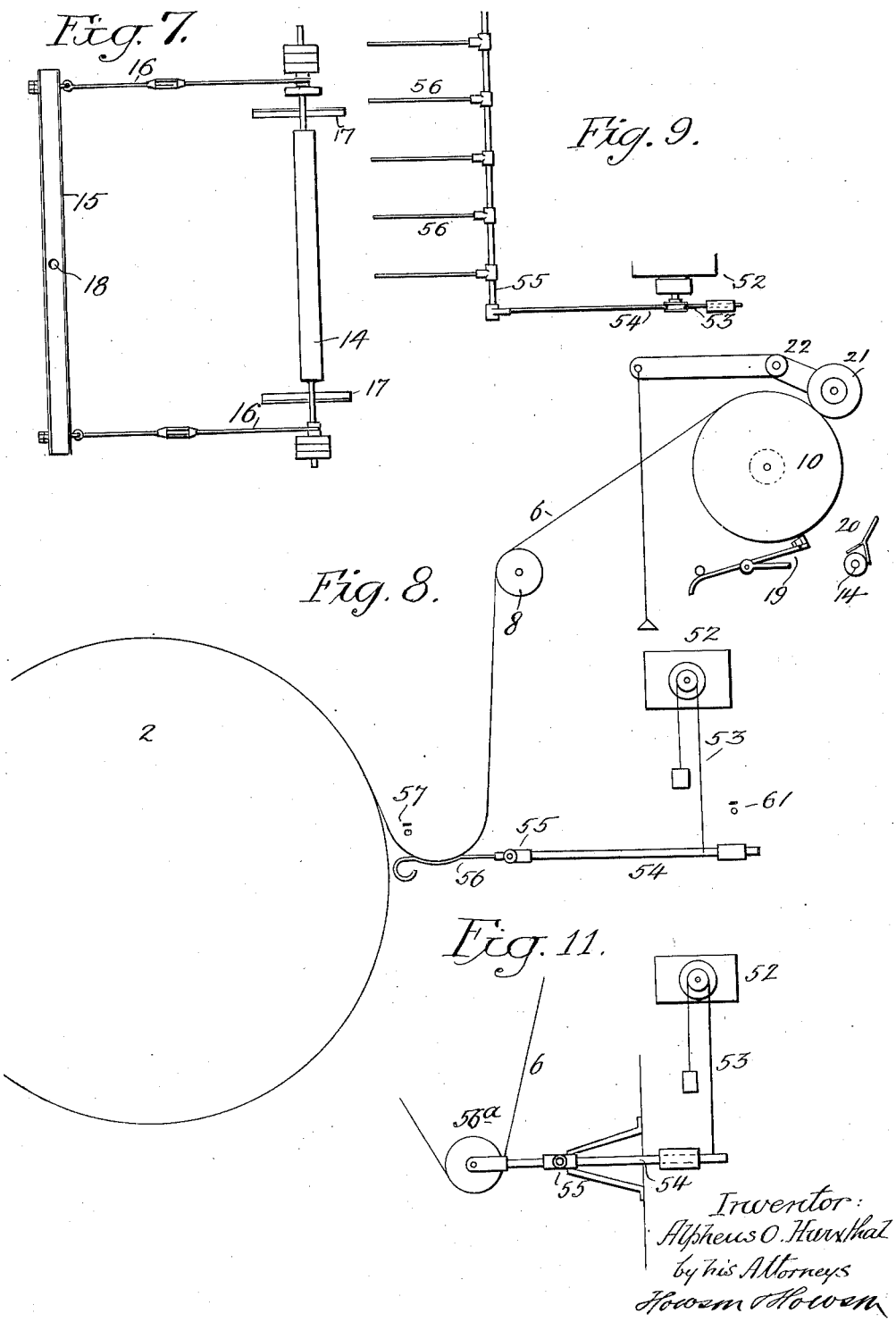

1,755,005

UNITED STATES PATENT OFFICE

ALPHEUS O. HURXTHAL, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA

FILTER-CAKE LOOP DRIER

Application filed April 24, 1926. Serial No. 104,501.

My invention relates to certain improvements in apparatus for drying filter cake while it is being carried by an endless apron upon which the material to be dried has accumulated upon the apron in a comparatively thin layer.

The invention is particularly adapted for use in filtering and drying white lead, although it will be understood that it can be used for filtering and drying any material which will adhere to the apron or foraminous belt, and which has to be dried so that it can be removed from the belt.

One object, therefore, of my invention is to construct a drier which will thoroughly dry the material carried by the foraminous conveying apron.

Another object of the invention is to provide means for regulating the feed of the belt by controlling the motor that drives the drum of the filter by the loop formed between the filter drum and the drier; and to provide a trough which acts as a means to hold the conveyor as the last loop is raised, the conveyor also acting to carry off loose particles of the material formed in the loop.

A further object of the invention is to provide means for removing the material from the conveyor and discharging it into the trough of a screw-conveyor.

A still further object of the invention is to provide means for controlling the motor that drives the drier.

The invention also relates to further details which will be described hereinafter.

In the accompanying drawings:

Fig. 7 is a plan view of the self-aligning looping-roll;

Fig. 8 is an enlarged side view of the control mechanism located between the filter drum and the drier;

Fig. 9 is a plan view of one end of the control mechanism shown in Fig 8;

Fig. 11 is a view illustrating a modification of the control mechanism.

Figure 1:
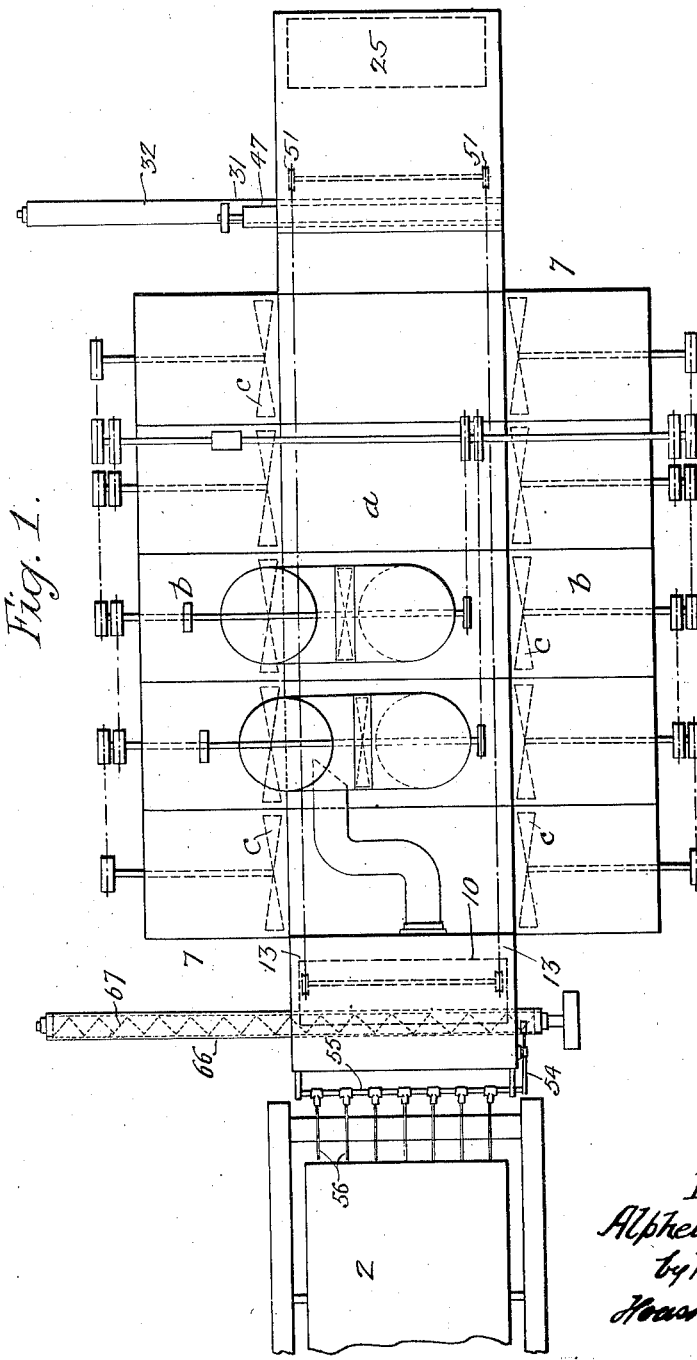
Fig. 1 is a plan view of the drier and filter drum in outline.

Referring to the drawings, 1 is a vat in which is located a drum 2. A motor 3 drives this drum through the belt 4, shaft 5, and gearing shown in Fig. 2. 6 is an endless belt conveyor made of wire-mesh or other foraminous material. The belt passes around the drum 2 and is submerged in the material, which in the present instance is white lead, which is in the vat 1. Above the drum is an endless pressure belt, the material-carrying belt passing between the drum and the pressure belt. The inner side of the drum is connected to suction mechanism, which draws the material onto the conveyor, and as this material is in a semi-liquid state it forms on the conveyor a comparatively thin layer.

I lay no claim to the details of construction of this apparatus, as other means may be used in applying the material to the endless conveyor.

As the belt passes from the drum 2, it is formed into a loop between the drum and the drier 7, the belt passing over a guiding-roll 8 near the upper end of the drier. The belt with the material thereon passes through an opening 9 in the casing of the drier 7 and around a drum 10 driven by a shaft 11 and suitable gearing. From this drum the conveyor passes down into the body of the drier 7 and is formed in a loop in front of one of the girts 12 of the endless chain carrier 13. A looping-roll 14 prevents the loop previously made from pulling out as a new one is being formed. This looping-roll is attached to a swingle-tree 15 by adjustable side rods 16 and rests upon rails 17 at each side of the drier. The swingle-tree is pivoted at 18, Fig. 7, so that the roll will accommodate itself to the girts as they pass in contact with the roll, thus insuring proper alignment.

In order to keep the surface of the drum 10 clean, a pivoted scraper 19 is provided. A scraper 20 is also provided for the looping roll 14. A pinch-roll 21 is pivotally mounted on an arm 22, and this roll can be lifted out of contact with the drum 10 when necessary and can be placed against the drum when the apparatus is started, so as to prevent slipping of the endless conveyor or the drum. There is a similar pinch-roll 21ª mounted on a lever 22ª which bears against the drum 25 at the delivery end of the machine, and is brought in contact with the endless conveyor when the machine is first set in motion, and after the mechanism is in operation, this roll can be withdrawn.

The drier may be of any length desired and may be divided into sections if necessary. In the present instance there is a central drying chamber $a$ and side circulating chambers $b$, Fig. 1, and circulating fans $c$, driven as indicated in the diagram shown in Fig. 1, circulating the air which has been heated to any degree desired by steam pipes or other heating apparatus in the compartments $b$.

At the discharge end of the machine the loops are drawn from the girts 12 of the carrier 13, passing over a guide-roll 23 and under a guide-roll 24, and then around a drum 25. Between the guide-roll 24 and drum is a beater 26 of any suitable type. In the present type, this beater consists of two disks 27 having pivoted arms which, as the beater is rotated, strike the foraminous conveyor and dislodge the dried material from the conveyor, discharging it into a hopper 29 which is at the upper end of a chute 30, leading into a transverse trough 31 in which is a screw-conveyor 32 carrying the material out of the drier.

Figure 4:
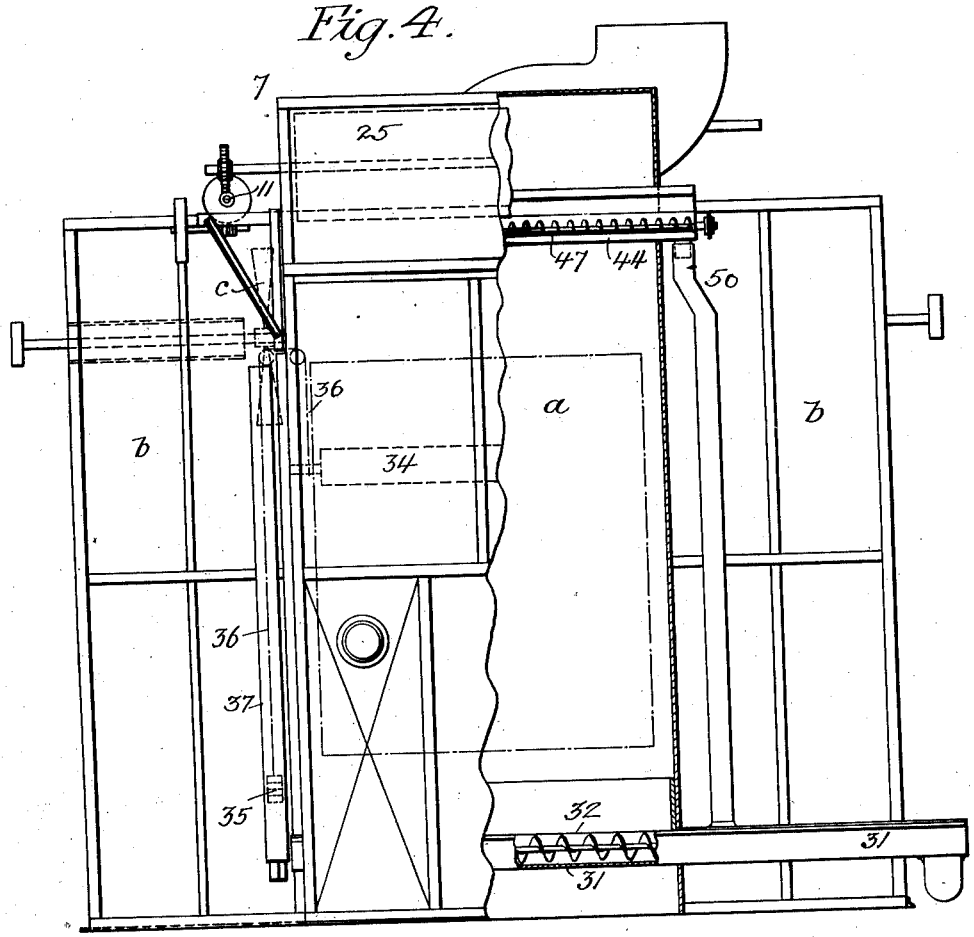
Fig. 4, is a rear view of the drier partly in section on the line 4—4, Fig. 3.
Figure 5:
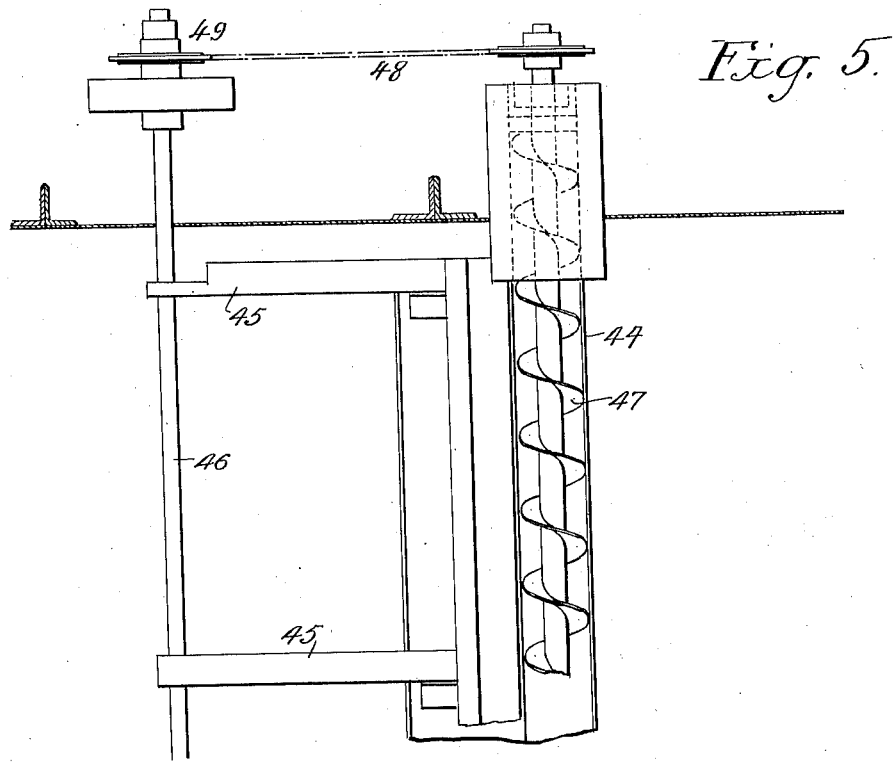
Fig. 5 is an enlarged sectional plan view of the upper portion of the rear end of the drier.

The foraminous belt then passes around a guide-roll 33 from the drum 25, and around a take-up roll 34 connected to a weight 35 by a chain or rope 36 on either side of the drier casing. Each weight is preferably located on the outside of the casing, as clearly shown in Fig. 4, and is located in a guide-tube 37. The foraminous conveyor 6 passes from the roll 34 around a guide-roll 38 down to a guide-roll 39 near the lower end of the drier, and then to a guide-roll 40 at the feed end of the drier and through an opening 41 in the drier casing, and over guide-rolls 42 and 43 at the filter drum, passing around the filter drum to again receive a charge of material.

In order to prevent the elongation of the loop which follows the loop being raised at the discharge end of the conveyor, a trough 44 is provided, which bears against that portion of the conveyor passing over the girt so as to hold the conveyor-belt under the guide and preventing it slipping, due to the preponderance of the weight of the long loop. This trough is mounted on arms 45 pivoted at 46, and the rear side of the trough is open as clearly shown in Fig. 6, so that when the loop is entirely raised as in said figure, any particles of material that are loose in the hopper are discharged into the trough, preventing the accumulation of loose material in the several loops that follow.

A screw-conveyor 47 is located in this trough and is driven from a belt-wheel by a belt 48 from a driven wheel 49 in line with the pivot 46 of the trough. The material is discharged from the trough into a chute 50 which carries the material into the lower conveyor trough 31. The connection between the trough 44 and the chute is telescopic, to allow the trough to turn on its pivot as one after another of the girts pass the trough. The carrier chains are located at each side of the drier and are connected by the girts in the ordinary manner and pass around sprocket-wheels 51, the sprocket-wheel 51ª being driven from the shaft 11 in any suitable manner.

Figure 2:
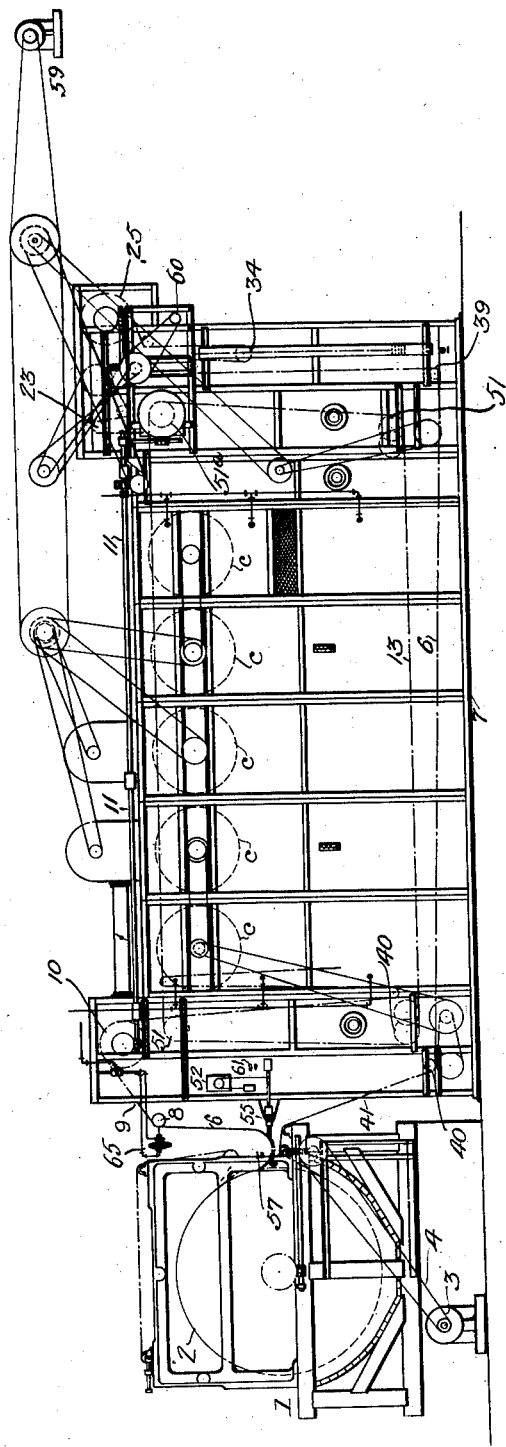
Fig. 2 is a side view.
Figure 3:
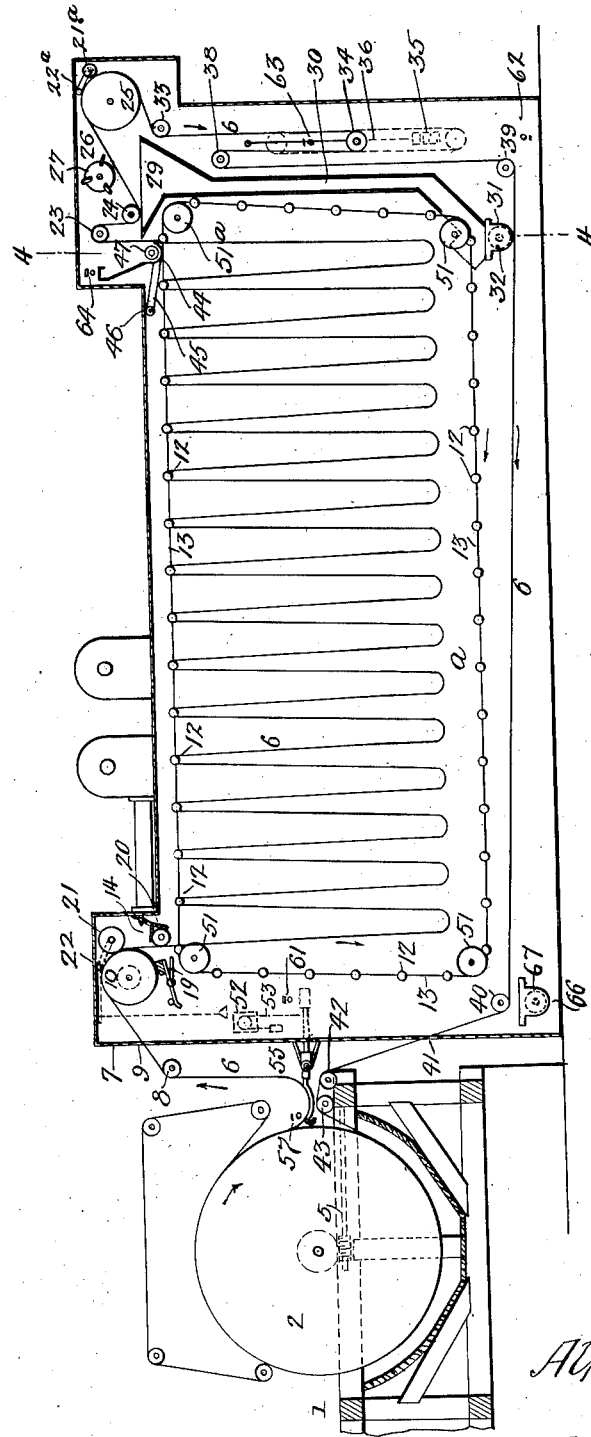
Fig. 3 is a longitudinal sectional diagrammatic view of the filter drum and drier.

The filter press-drum is driven by the small motor 3, in order to synchronize the speed of the filter drum with the speed of the drum 10 at the feed end of the drier. The motor 3 is equipped with a rheostat 52. This rheostat is fastened to the side of the drier and is operated by means of a sprocket and chain 53 from a lever 54 pivoted at 55. This lever 54 has a series of fingers 56 which extend under the loop formed in the foraminous conveyor between the filter drum 2 and the drier, as shown in Fig. 2. The lever has an adjustable weight as clearly shown in Figs. 8 and 9, which can be regulated to locate the fingers 56 in correct position under the loop.

If the drum 2 feeds the conveyor belt faster than the drier mechanism can take up the conveyor, then the loop is extended and it comes in contact with the fingers 56 of the lever. This actuates the rheostat and reduces the motor 3 until such time the loop is raised, when the lever will assume its normal position. If the loop should be shortened, as shown by dotted lines in Fig. 2, then it comes in contact with a switch 57 which will be thrown, and which in turn will release the main switch 58 which will stop the motors 3, 59 and 60.

The motor 59 is the driving motor for the drier, with the exception of the delivery end drum 25, while the motor 60 is the motor that drives the said end drum 25. A switch 61 is located in the path of the lever 54, so that when the lever is raised to its extreme position, it will pull the switch 61 and stop all three motors. The lower switch 62 and the upper switch 63 are in the path of the weight 35 of the tension roller 34 at the delivery end of the drier, so that when the tension roller is raised to its extreme position the weight will throw the switch 63 and stop the motors, and when the tension roll 34 is in its lowest position then the weight will actuate the switch 63 and also stop the motors.

A switch 64 is located in the path of the upper trough 44, so that when the trough is raised to its extreme position it will actuate the switch. This switch 64 controls only the small motor 60 which drives the rear drum 25.

Figure 6:
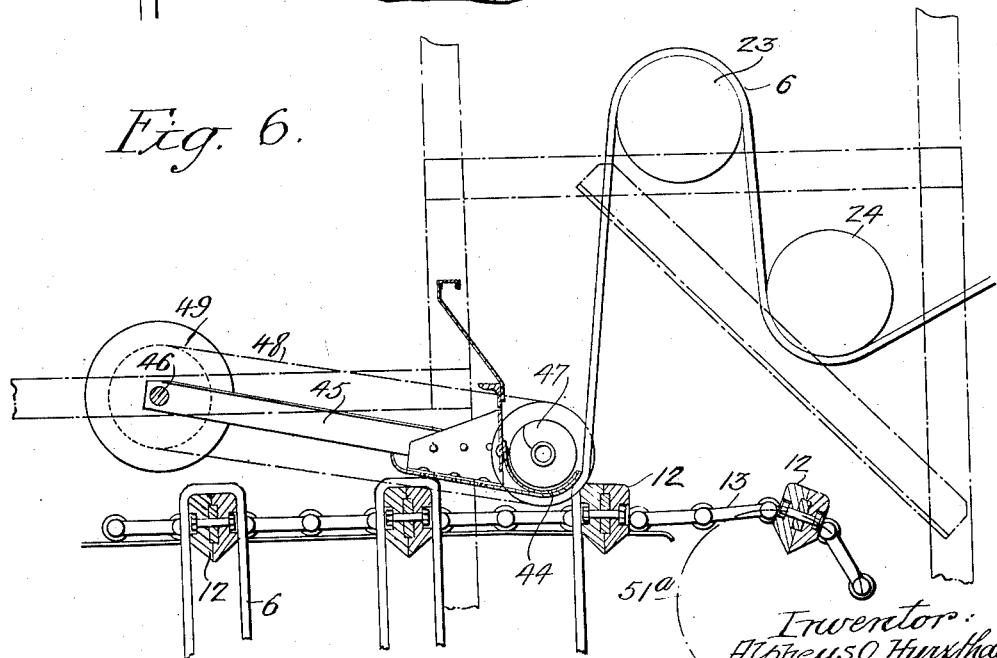
Fig. 6 is a vertical sectional view of the upper portion of the rear end of the drier, illustrating the upper pivoted conveyor trough and screw.
Figure 10:
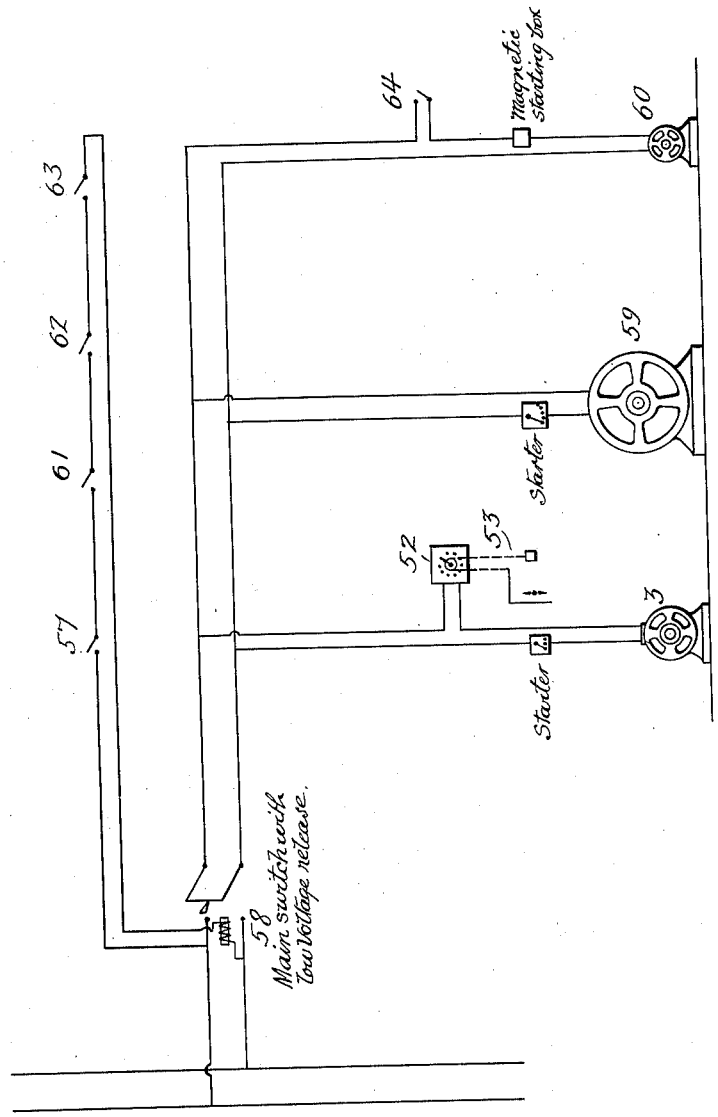
Fig. 10 is a diagram of the electric wiring.

The girts on which the conveyor is suspended in loop form consists of a metal bar sheathed with wooden strips held by transverse bolts, as clearly shown in Fig. 6. On the ends of the bars are clips by which they are attached to endless chains which may be of the ordinary link belt type. The undersides of the girts are tapered as shown so as to prevent the material adhering on the return run.

In place of the fingers 56 on the arm 54 which are located under the loop of the belt 6, a roller 56$^a$ may be located in the loop, this roller is made of a series of circular blades spaced apart, these blades rest in the loop as shown in Fig. 11, so that as the loop changes position, the arm 54, which is connected to a variable rheostat, also changes position and regulates the speed of the motor that drives the filter drum.

The roller 8 over which the belt 6 passes is preferably controlled by a differential device 65 which is actuated by shoes within the drier at each side of the belt, so that should the belt shift laterally in either direction, the roller 8 will be adjusted accordingly so as to bring the belt back to its normal position.

While I have shown the switch 64 located above the trough 44 of the upper conveyor so that it will be actuated when the trough is raised, the switch may be located in any position in respect to the trough or the run of the belt as it leaves the trough, so that in case the belt becomes taut between the girts and the rear drum, it will actuate the switch and stop the rear drum.

It will be noticed that the forward driving drum is driven independently from the rear driving drum, and that mechanism is provided for controlling the motor or other driving mechanism for the rear drum. The material, white lead, for instance, which is carried by the foraminous belt, varies in thickness, and the belt with this material passes over the forward driving drum, but the material has been removed from the belt before it reaches the rear drum so that there is a certain amount of differential movement of the belt between the front and rear drum, and this must be controlled, otherwise the drier mechanism would be inoperative.

Therefore, by providing means, an electric switch in the present instance, for controlling the motor that drives the rear drum, and placing the switch in such position that it can be actuated by the trough of the upper conveyor or by the belt, the rear drum can be stopped momentarily until the belt has moved forward sufficiently to provide slack, which will release the switch and start the motor.

In the present instance a trough 66 is located under the guide-roller 40 and in this trough is a screw-conveyor 67 which removes any loose material that may collect in the trough.

The operation of the mechanism is as follows:—The machine shown in the drawings is especially designed as a machine for drying white lead filter cake. The white lead is drawn onto the foraminous endless conveyor by suction while on the drum 2, and the endless belt passes into the drying chamber of the drying apparatus, where it is subjected to heated air in circulation. The conveyor is formed into loops which are suspended from girts which are traversed through the drier by an endless carrier of any ordinary type.

When the loops reach the delivery end of the drier, one loop after another is drawn from its girt and passes under a beater, where the dried lead is removed from the conveyor and discharged into a hopper and carried into the conveyor trough 31, the conveyor and trough discharging the white lead at one side of the drier. Any loose material collected in the loops is discharged into an upper conveyor trough, and the conveyor in said trough carries this loose material to one side of the drier and discharges it into the main conveyor trough. This upper trough also acts as a pinching means to hold the succeeding loops as a loop is raised, so as to prevent the over-balanced loop from elongating.

Mechanism is provided for controlling the speed of the drum, and the speed of the mechanism in the drier is synchronized by the lever mechanism which controls a rheostat and which latter in turn controls the motor of the filter drum. Other switches are so located that when the belt moves to extreme positions, the motors will be stopped, thus preventing any break-downs.

I claim:—

1. The combination of a filter drum; a drier; an endless conveyor passing around the drum and through the drier, said conveyor being looped between the drum and the drier; means for driving the filter drum and thereby advancing that portion of the conveyor carried thereby; means independent of the drum driving means for advancing that portion of the conveyor located within the drier; and means for automatically controlling the speed of the drum through the medium of the loop formed in the conveyor between the drum and the drier.

2. The combination of a filter drum; a drier; an endless foraminous belt passing around said drum and through the drier in the form of a plurality of loops; a carrier for said loops; means for forming the conveyor in said loops on said carrier; a rear drum for drawing the conveyor out of said loops; independent means for driving the filter drum and thereby advancing that portion of the conveyor carried thereby; an independent means for driving the loop forming and carrier mechanisms of the drier; independent means for driving the said rear drum; and means associated with one of said independent driving means and adapted to be controlled by the conveyor for controlling the operations of the said independent driving means.

3. The combination of a filter drum; a drier; an endless foraminous belt passing around said drum and through the drier in the form of a plurality of loops; a carrier for said loops; means for forming the conveyor in said loops on said carrier; a rear drum for drawing the conveyor out of said loops; independent means for driving the filter drum and thereby advancing that portion of the conveyor carried thereby; an independent means for driving the loop forming and carrier mechanisms of the drier; independent means for driving the said rear drum; means associated with one of said independent driving means and adapted to be controlled by the conveyor for controlling the operations of the said independent driving means; and means adapted to be actuated by the conveyor for stopping the operations of all the said independent driving means simultaneously.

4. The combination of a vat; a filter drum located in the vat; a motor for driving the drum; a drier; an endless foraminous belt extending around the drum and through the drier, thereby advancing that portion of the belt carried by the drum; means independent of the drum driving motor for advancing that portion of the conveyor located within the drier; said belt being in the form of a loop as it passes from the drum to the drier; a rheostat controlling the motor which drives the drum; and a lever for actuating the rheostat, said lever having fingers extending under the loop so that when the loop is elongated it will come in contact with the fingers and operate the lever which in turn actuates the rheostat and which in turn reduces the speed of the motor.

5. The combination of a vat; a filter drum therein; a loop drier; an endless foraminous conveyor extending around the drum and through the drier; a carrier having transverse girts upon which the conveyor is looped; a conveyor-trough at the discharge end of the drier which frictionally holds the conveyor onto the girt as the last loop is raised so as to prevent slipping of the conveyor, said trough being open at its rear side to receive any loose particles of material from the conveyor; and means in the trough for removing the material.

6. The combination of a drier; an endless belt conveyor extending through the drier; a carrier having transverse girts over which the belt is looped; a looping-roll bearing upon the conveyor as it is formed into a loop over the girts; and a swingle-tree to which the looping-roll is attached so that the roll will accommodate itself to the girts.

7. The combination of a drum; a drying chamber; an endless belt passing around the drum and through the drying chamber and on which the material is carried; a beater at the discharge end of the drying chamber for detaching the material from the belt; and a conveyor-trough arranged to yieldingly press against the belt at the last loop so as to prevent slipping of the belt at this point, said trough being open at one side to receive loose material that has accumulated in the loop of the belt and a conveyor in the trough.

8. The combination in a drier, of a foraminous belt; means for festooning the belt in the form of loops; a front driving drum; a rear driving drum; and means for controlling the rear driving drum independent of the front driving drum so that in the event of the belt being taut in advance of the said rear drum, the mechanism for driving said drum will be stopped until the belt becomes slack.

9. The combination of a drier; an endless foraminous conveyor passing through the drier, said conveyor being extended outside the drier at the feed end of the drier to allow material to be applied thereto in a thin layer; means for advancing that portion of the conveyor located outside the drier; means for independently advancing that portion of the conveyor located within the drier; an intermediate loop being formed between said portions of the conveyor at the feed end of the drier; and means for automatically controlling the speed of the conveyor through the medium of the loop formed in the conveyor.

10. The combination of an endless conveyor; a drier through which the conveyor travels to dry material carried by the conveyor; means outside the drier for applying a thin film of material to the conveyor; means for independently advancing that portion of the conveyor located outside the drier; means for independently advancing that portion of the conveyor located within the drier, and means governed by a loop in the conveyor between the drier and the means for applying the material to the conveyor, for synchronizing the travel of the conveyor while the material is being applied and while the conveyor is traveling through the drier.

ALPHEUS O. HURXTHAL.